United States Patent [19]
Price

[11] 3,731,897
[45] May 8, 1973

[54] CAMERA BRACKET
[76] Inventor: Allan S. Price, 1954 N. Fremont Street, Chicago, Ill. 60614
[22] Filed: June 30, 1971
[21] Appl. No.: 158,215

[52] U.S. Cl. ..................248/230, 248/299, 95/86
[51] Int. Cl. ...........................................G03b 17/56
[58] Field of Search..................248/221, 230, 286, 248/299, 279; 95/86; 240/1.3

[56] References Cited

UNITED STATES PATENTS

| | | | |
|---|---|---|---|
| 1,554,055 | 9/1925 | White | 248/299 |
| 1,826,843 | 10/1931 | Thomas | 248/299 |
| 1,854,478 | 4/1932 | Meyers | 248/230 |
| 1,965,668 | 7/1934 | RIngwald | 248/299 |
| 2,135,797 | 11/1938 | Chambers | 248/299 |
| 2,599,269 | 6/1952 | Markle | 95/86 |
| 2,689,995 | 9/1954 | Smith | 248/230 |
| 2,700,100 | 1/1955 | Wissinger | 248/230 |
| 2,985,415 | 5/1961 | Stahl | 248/122 |
| 3,289,563 | 12/1966 | Kent | 95/86 |
| 3,550,519 | 12/1970 | Lewis | 95/86 |

FOREIGN PATENTS OR APPLICATIONS

| | | | |
|---|---|---|---|
| 913,550 | 12/1962 | Great Britain | 95/86 |
| 532,200 | 8/1931 | Germany | 248/230 |
| 126,508 | 10/1949 | Sweden | 248/230 |
| 161,330 | 4/1933 | Switzerland | 248/230 |

*Primary Examiner*—Marion Parsons, Jr.
*Attorney*—Edward C. Threedy

[57] ABSTRACT

A portable support for supporting a camera during use thereof from the shaft of an umbrella, automobile antenna, or the like, wherein means is provided for removably and firmly connecting the camera to the bracket and the bracket to such shaft, the bracket having means for optionally connecting the same to a combination handle and flash unit mount or the like, in lieu of connection to the umbrella shaft or the like.

4 Claims, 9 Drawing Figures

PATENTED MAY 8 1973 3,731,897
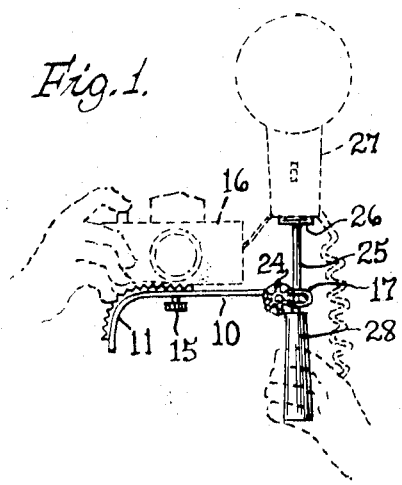
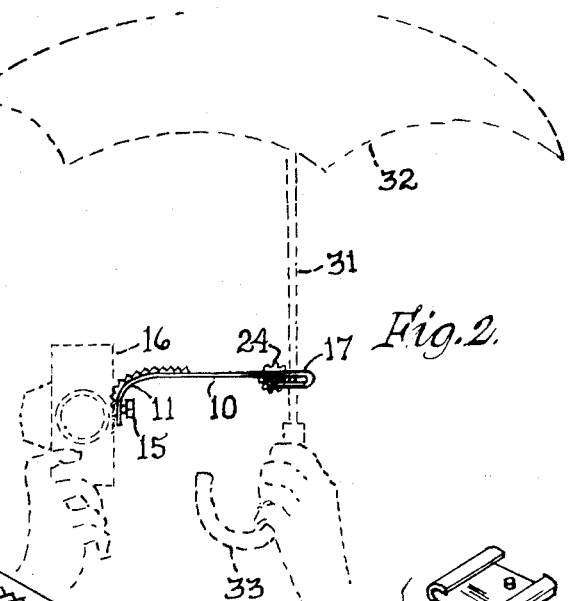
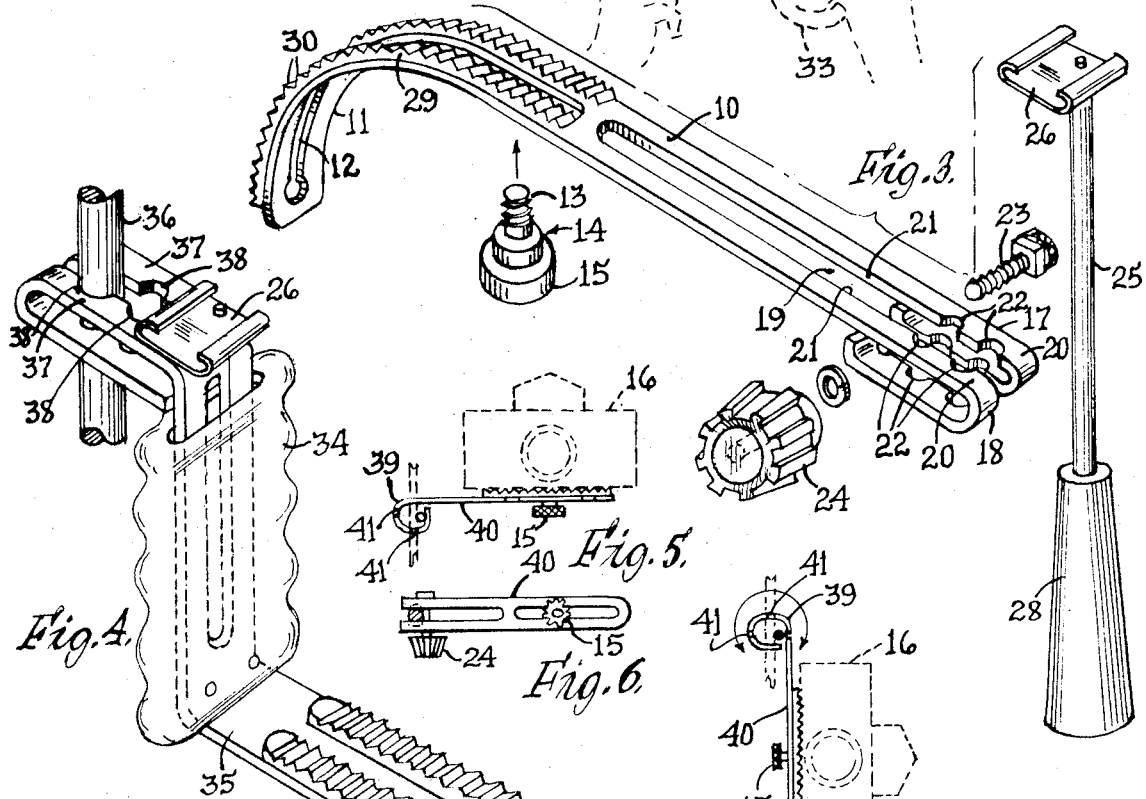
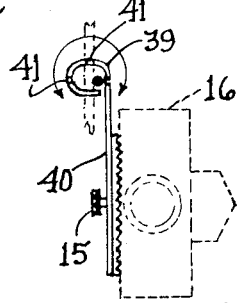
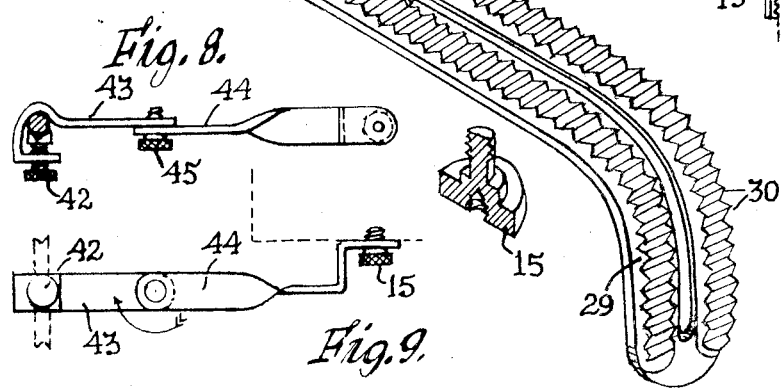
INVENTOR.
ALLAN S. PRICE
Edward C. Threedy
HIS ATTORNEY

CAMERA BRACKET

SUMMARY OF THE INVENTION

One of the problems in using a camera during inclement weather, such as rain or the like, is to protect the camera from being damaged and to eliminate moisture from collecting on the lens. It is extremely difficult, if not impossible, to hold the camera steady in one hand while holding an umbrella in the other hand. My invention has for one of its objects the provision of a simple construction for removably mounting the camera on the shaft of an umbrella, thus to facilitate protection of the camera as well as its proper and steady support during the picture-taking operation.

A second embodiment of the bracket, generally the same as the first, has an integral handle and an integral flash unit mount, both embodiments having a curved surface for mounting the camera at any angle with respect to said shaft. A third and novel means of connecting the bracket to the shaft allows the same angular camera positions. A fourth bracket embodiment has another means of connection to the shaft and another means of angling the camera with respect to the shaft.

Another feature of my invention is found in the fact that the camera bracket is of such construction as to permit the bracket to be optionally attached to the shaft of an umbrella or an automobile antenna or upon a tripod or the like, or to an elongated shaft serving as a handgrip during use of the camera.

Still another feature of my invention is that the camera bracket is constructed with curved surface so that the mounted camera can be aimed in several unique directions with respect to the clamped shaft. A need for such feature arises when the camera and bracket are used with an umbrella and the umbrella must stay substantially vertical while the camera must be able to point in any direction.

Still another feature of my invention is the way in which the flash unit can be manipulated with respect to the camera for what is known as "bounce flash" effects, where light is bounced off walls, ceilings or the like, onto the subject being photographed. When the flash unit mount is fixed to a shaft, this allows the flash unit to be rotated, raised or lowered within the shaft clamping means of the bracket. Also since the camera can be mounted on the curved surface of the bracket, this allows the light to be bounced in many directions with respect to the camera.

A second embodiment of my invention is a simplified combination of the same clamping means to a shaft and the same mounting means for the camera, but a mount for a flash unit hooked directly to the bracket, and a handle for manipulation of the camera also hooked directly to the bracket, leaving the shaft clamping means available for attachment to an umbrella or the like.

Still another intent is to show several novel ways of clamping the bracket to the shaft and several novel ways of obtaining angular adjustment of the mounted camera with respect to a generally vertical shaft.

GENERAL DESCRIPTION

The invention consists of the novel combination and arrangement of parts shown in the accompanying drawings, in which:

FIG. 1 is an elevational view of the invention showing the camera bracket in conjunction with the "bounce flash" arrangement;

FIG. 2 shows the bracket embodied in the invention attached to the shaft of an umbrella;

FIG. 3 is a perspective view of the various parts of the bracket and flash support shown in exploded relation with respect to each other;

FIG. 4 is a second embodiment of the invention with integral handle and integral flash unit mounting means;

FIG. 5 is a third embodiment of the invention with two clamping positions at right angles to each other;

FIG. 6 is an under view of FIG. 5;

FIG. 7 shows the camera clamped in the second position from that shown in FIG. 5;

FIG. 8 shows another means of clamping the bracket to the shaft and another means of angling the camera with respect to the shaft;

FIG. 9 is an elevational view of the means shown in FIG. 8.

Referring more particularly to the drawings showing the preferred form of construction of the camera, there is provided an elongated supporting bar 10, one end 11 of which is substantially curved in the form of a quarter circle from the longitudinal axis of the bar, as shown.

Formed in the curved end portion of the bar 10 is an elongated slot 12 for the projection of the shank 13 of a mounting screw 14 having an enlarged head 15 preferably knurled to facilitate manipulation of the same. The shank 13 is adapted to be threaded into a threaded socket (not shown) of a camera 16 of any conventional construction. The opposite end portion 17 of the bar 10 is bent substantially U-shaped as at 18 and has formed therein an elongated slot 19 to facilitate drawing together the limbs 20 provided by slotting the bar 10 so that the end portion 17 may firmly grasp a shaft or the like projected through the slot at that end of the bar. In the U-shaped end portion 17 of the bar 10 on the adjacent edges 21 of the limbs 20, there are provided corresponding notches 22 which receive the shaft when the latter is projected through the slotted portion of the end portion 17. In the present instance I have provided two sets of notches 22 to accommodate shafts of varying diameters in one of two locations with respect to the U-shaped end portion 17.

A threaded bolt 23 is fixedly carried by one of the limbs 20 and extends beyond the other limb 20 when assembled. On this bolt 23 is threaded a draw nut 24 whereby, by adjusting the nut, the ends of the limbs 20 will be drawn tightly against the shaft, thereby to clampingly secure the shaft in a selected position with respect to the supporting bar 10 of the camera bracket.

In FIGS. 1 and 3 of the drawings, I have shown the shaft 25 fixedly carrying at its outer end portion a foot element 26 which is adapted to cooperate with a connecting element of a flash unit 27 to mount the same. Mounted to the shaft 25 by any suitable means, such as threading, pressfitting or the like, is a handle 28 which permits the camera support to be held conveniently by the hand of the operator when it is used in connection with the flash unit 27 (FIG. 1).

There is preferably mounted on the curved end portion 11 of the bar 10 a non-skid padding 29 preferably of rubber or the like and knurled as at 30 so as to provide a firm support for the camera 16 to insure its stability when mounted on the bar 10. The camera may be placed upon the bar 10 as shown in FIG. 1 or, if desired, it may be adjusted to any position with respect to the curved end portion 11, as will be permitted by reason of the slot 12 (FIG. 2).

In FIGS. 2 and 3, I have shown the camera bracket attached to the shaft 31 of an umbrella 32 which includes as a part thereof a handle 33.

As shown in FIG. 1, the camera 16 can be rotated about its mounting screw 14 to enable aiming of the camera across the horizon while keeping the clamped shaft substantially vertical, and in FIG. 2 the camera can be rotated about its mounting screw to aim the camera at any object on the ground or in the sky while again keeping the umbrella shaft 31 generally vertical. The camera can, in fact, be aimed in substantially all directions since the axis of rotation about the mounting screw can be positioned at any angle on the curved mounting surface 11. This same relation exists between the shaft 25 and the camera to enable "bounce flash" effects. In addition, the curved surface 11 allows traditional turning of the camera to fit the subject being photographed into an elongated rectangular negative.

The two notches 22 are radiused to fit exactly to two of the most common umbrella shaft diameters; however, other shaft diameters can also be firmly attached and even hexagonal shafts or other shapes can be clamped.

As shown in FIG. 4, a handle 34 and the same foot element 26 are non-detachably fixed to a support plate 35. The method of clamping a shaft 36 and the curved surface for camera mounting are identical to those described in FIGS. 1, 2 and 3. The embodiment of FIG. 4 does not have the "bounce flash" capabilities that come with rotation of the foot 26 as shown in FIG. 1; however, it utilizes the support plate 35 to perform the functions of parts 25 and 28 and therefore constitutes an improvement. As shown in FIG. 4, the handle 34 is attached to the support plate 35 so as not to interfere with the movement of the limbs 37 or the clamping action of the notches 38.

FIGS. 5, 6 and 7 show a novel and simple method of obtaining multiple positions of a camera with respect to a substantially vertical shaft. Here the clamping function is used to provide two of the camera positions that the curved mount 10 in FIGS. 1 and 2 provided. The generally circular bend 39 of the support plate 40 provides for location of notches 41 shown in FIGS. 5 and 6 at right angles to each other. More notches would provide intermediate camera angles with respect to the clamped shaft. The clamping method is generally the same as described in FIG. 3, with the addition of more notches disposed around a circular bend 39. This embodiment is simpler than those described in FIGS. 3 or 4, yet accomplishes in a different way some of the same functions.

FIGS. 8 and 9 show another method of shaft clamping where the thumb screw 42 applies a holding force directly to the shaft. The support plate is divided into two parts 43 and 44, and angling of the camera is accomplished at the joint between parts 43 and 44 by a thumb screw 45.

From the foregoing description, it is apparent that I provide a support for a camera which may be conveniently attached to the shaft of an umbrella, automobile antenna, tripod, or combination handgrip and flash unit mount, and, when attached, the camera will be firmly and steadily held in position during its use. The bracket is made up of parts relatively few and simple in construction, thus permitting economical manufacture and sale.

While I have illustrated and described the preferred forms of construction for carrying my invention into effect, they are capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A mounting bracket for a camera including a camera connector carried thereby, comprising
   a. an elongated member having means at one end for adjustable connection to a support and means at an opposite end for adjustable connection to the camera,
   b. said means at one end of said member comprising bifurcated limbs spaced normal to each other,
   c. said limbs having their ends bent back upon themselves and with a portion thereof reversely angled to form an elongated loop adapted to receive a limb-compressing connector therein,
   d. a connector adapted to extend through said elongated loop transversely to the length of said bifurcated limbs for compressing said limbs in clamping contact onto a support,
   e. said means on said opposite end of said elongated member comprising a closed slotted portion curved out of the normal plane of said member in a like direction to the bent ends of said limbs and terminating in a portion having a length substantially perpendicular relative to said member,
   f. said slot being of a length to extend in a horizontal and vertical plane to accommodate linear movement therethrough of the camera connector so that the same may be multi-positioned relative to said support.

2. A mounting bracket for a camera as defined by claim 1, wherein said limbs and their ends are provided with confronting and cooperating semicircular notches of varying radii to accommodate supports of different diameters.

3. A mounting bracket for a camera as defined by claim 1, wherein said elongated member provides a handle portion between said bifurcated limbs and said closed slotted portion to facilitate holding the mounting bracket while in use.

4. A mounting bracket for a camera as defined by claim 3 wherein said limbs and their ends are provided with confronting and cooperating semicircular notches of varying radii to accommodate supports of different diameters.

* * * * *